(12) United States Patent
Ramaswamy et al.

(10) Patent No.: US 9,384,551 B2
(45) Date of Patent: Jul. 5, 2016

(54) AUTOMATIC RECTIFICATION OF STEREO IMAGING CAMERAS

(71) Applicant: Amazon Technologies, Inc., Reno, NV (US)

(72) Inventors: Sharadh Ramaswamy, Sunnyvale, CA (US); Matthew Paul Bell, Sunol, CA (US); Dmitri Khoklov, Seattle, WA (US); David W. Stafford, Cupertino, CA (US); Isaac Scott Noble, Ladera Ranch, CA (US)

(73) Assignee: Amazon Technologies, Inc., Reno, NV (US)

( * ) Notice: Subject to any disclaimer, the term of this patent is extended or adjusted under 35 U.S.C. 154(b) by 547 days.

(21) Appl. No.: 13/858,813

(22) Filed: Apr. 8, 2013

(65) Prior Publication Data
US 2014/0300704 A1   Oct. 9, 2014

(51) Int. Cl.
*H04N 13/02* (2006.01)
*G06T 7/00* (2006.01)

(52) U.S. Cl.
CPC ............ *G06T 7/002* (2013.01); *H04N 13/0239* (2013.01); *H04N 13/0242* (2013.01); *H04N 2213/001* (2013.01)

(58) Field of Classification Search
CPC ............... G06T 7/002; H04N 13/0239; H04N 13/0242; H04N 2213/001
USPC .......................................................... 348/48
See application file for complete search history.

(56) References Cited

U.S. PATENT DOCUMENTS

| 5,606,627 A | 2/1997 | Kuo | |
|---|---|---|---|
| 2003/0156751 A1 | 8/2003 | Lee et al. | |
| 2007/0058717 A1* | 3/2007 | Chosak | G06K 9/32 375/240.08 |
| 2007/0126334 A1 | 6/2007 | Nakamura et al. | |
| 2007/0168942 A1 | 7/2007 | Kaplan | |
| 2007/0288141 A1* | 12/2007 | Bergen | G01C 21/005 701/38 |
| 2008/0002879 A1 | 1/2008 | Jeon et al. | |

(Continued)

FOREIGN PATENT DOCUMENTS

WO    WO 2012/044216    4/2012

OTHER PUBLICATIONS

"Projective Rectification without Epipolar Geometry" Isgro and Trucco; Intl. Conference on Computer Vision and Pattern Recognition 1999; 6 pages.

(Continued)

*Primary Examiner* — Anner Holder
(74) *Attorney, Agent, or Firm* — Polsinelli LLP (57) ABSTRACT

An electronic device can have two or more pairs of cameras capable of performing three-dimensional imaging. In order to provide accurate disparity information, these cameras should be sufficiently rectified. Automatic rectification can be performed by periodically capturing images with the cameras of interest, and locating matching feature points in corresponding images captured by those cameras. Small misalignment errors can be treated as linear translations, such that a set of linear equations can be used to solve for the misalignments. Another process can process a set of homographies for the cameras until a cost function converges. Various other approaches can be used as well, such as to directly solve for yaw, pitch, and roll errors. Once this information is obtained, the misalignment values (or related values) can be stored for use in correcting images subsequently captured by those cameras.

20 Claims, 7 Drawing Sheets

(56) References Cited

U.S. PATENT DOCUMENTS

| | | | |
|---|---|---|---|
| 2008/0167814 A1* | 7/2008 | Samarasekera | G01C 21/005 |
| | | | 701/469 |
| 2010/0166294 A1 | 7/2010 | Marrion et al. | |
| 2011/0128353 A1 | 6/2011 | Leung et al. | |
| 2012/0237114 A1 | 9/2012 | Park et al. | |
| 2012/0275667 A1 | 11/2012 | Lu | |
| 2013/0002814 A1 | 1/2013 | Park et al. | |
| 2013/0107039 A1* | 5/2013 | Mehta | G06N 5/00 |
| | | | 348/135 |
| 2013/0148851 A1* | 6/2013 | Leung | G06K 9/3241 |
| | | | 382/103 |
| 2014/0125771 A1* | 5/2014 | Grossmann | H04N 13/0246 |
| | | | 348/47 |
| 2014/0306963 A1* | 10/2014 | Sun | H04N 13/0402 |
| | | | 345/427 |

OTHER PUBLICATIONS

"Theory and Practice of Projective Rectification" Hartley; Intl. Journal on Computer Vision 1999; 13 pages.

"International Search Report and Written Opinion Aug. 18, 2014", International Application PCT/US2014/033401, 14 pages.

* cited by examiner

AUTOMATIC RECTIFICATION OF STEREO IMAGING CAMERAS

BACKGROUND

People are increasingly interacting with computers and other electronic devices in new and interesting ways. For example, mobile devices are increasingly offering multiple high quality cameras that enable additional types of functionality. In some devices, one or more pairs of these high quality cameras can be used to provide three-dimensional ("3D") image capture, such as stereoscopic image capture, for both still and video imaging. A pair of cameras capturing three-dimensional images is offset by an amount that causes objects represented in an image captured by each camera to be located in slightly different locations, as the objects are imaged from slightly different points of view. The difference in location between the images, commonly referred to as the amount of disparity, is what gives a three-dimensional image its apparent depth when displayed to a user, as the amount of disparity changes with distance of an object from the cameras. Based on information such as the amount of offset between the cameras, the disparity also can be used to provide a measure of distance to each of the objects represented in the three-dimensional image. In order to produce an accurate 3D image with accurate distance information, however, the cameras have to be properly aligned, such as to have substantially parallel optical axes. Unfortunately, the cameras can become out of alignment over time due to effects such as shock and mechanical wear. While calibration procedures exist to compensate for misalignments, these procedures typically require user interaction and a calibration object, which is not convenient in many situations, and does not allow for continued, incremental adjustments over time unless the user frequently recalibrates the camera system.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to acquiring image information using an electronic device. In particular, various embodiments enable the capture of three-dimensional (3D) image data with accurate disparity information. In order to provide the accurate disparity information, various approaches can automatically correct for misalignments of any of a set of cameras. Such approaches can be performed unknown to a user, in at least some embodiments, and do not require a known calibration object or manual intervention on the part of the user.

In one embodiment, two or more pairs of cameras can be rectified by capturing images using each of the cameras and locating feature points (or interest points, corners, etc.) that appear in each of those images. Image rectification generally refers to a transformation process used to project two or more images onto a common image plane, correcting for image distortion by transforming the image into a standard coordinate system. Rectifying cameras, then, refers to determining misalignments or other aspects of those cameras that can result in such image distortion, and using this information to correct for resulting distortions in images subsequently captured by those cameras. For small errors, misalignments of any or all the cameras can be treated as linear translations in the images. Accordingly, a set of linear equations can be used to solve for the misalignments of each camera, as determined by the coordinates of the located feature points. In other embodiments, a set of homographies can be determined for the cameras using the coordinates of the feature points. By iterating over the homographies until a cost function converges, the misalignments of the cameras can be solved together. Other approaches can be used as well, such as to attempt to directly solve for yaw, pitch, and roll errors. Once this information is obtained, the misalignment values (or related values) can be stored for use in correcting images subsequently captured by those cameras. The process can be repeated at relatively short intervals in order to ensure that misalignments between intervals remain relatively small, and to ensure that the cameras are sufficiently rectified at all times.

Various other applications, processes, and uses are presented below with respect to the various embodiments.

Figure 1:
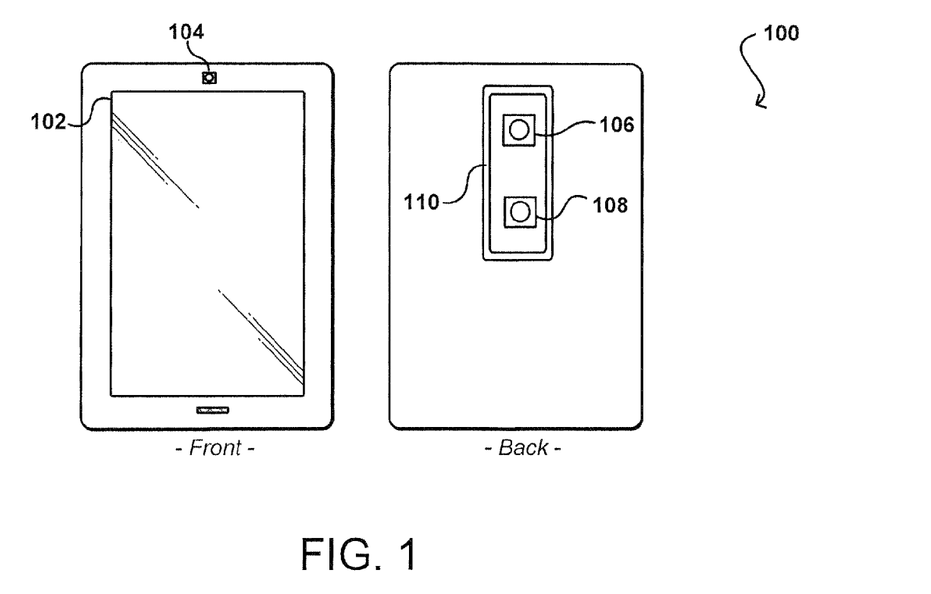
FIG. 1 illustrates front and back views of an example computing device including a conventional pair of cameras for 3D imaging that can be utilized in accordance with various embodiments.

As mentioned above, conventional electronic devices offer 3D imaging using a pair of high resolution matched cameras. For example, FIG. 1 illustrates front and back views of an example electronic device 100 of the prior art wherein a front of the device includes a display screen 102 and other input elements, such as a front-facing camera 104 for video chat or other such purposes. The display can be, for example, a glasses-free 3D capable display, a display capable of presenting glasses-assisted 3D image information, or a conventional 2D display. The device also includes a pair of matched cameras 106, 108 on the back side of the device. These cameras are separated a distance sufficient to enable three-dimensional imaging and typically are relatively high resolution cameras (e.g., 5.0 MP or above for conventional devices). Processes discussed herein can be used to rectify a pair of cameras, accounting for misalignments along at least one axis.

Figure 2:
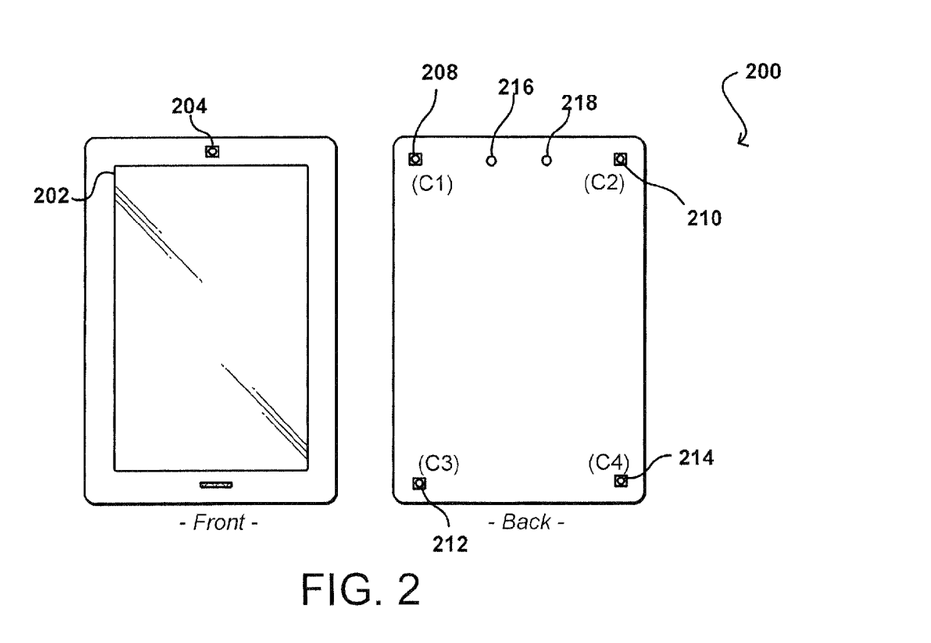
FIG. 2 illustrates front and back views of an example computing device including a multiple cameras capable of providing 3D imaging in accordance with various embodiments.

FIG. 2 illustrates front and back views of another electronic device 200 that can be utilized in accordance with various embodiments. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, and portable media players, among others. The electronic device can utilize some of the same elements as a conventional device, such as may include a display screen 202 and at least one front-facing camera 204. This example also includes four cameras 208, 210, 212, 214 arranged to provide at least two stereoscopic imaging pairs. These cameras are labeled C1, C2, C3, and C4 for reference, as used later herein. While shown on the backside of the device in this example, it should be understood that the pairs could be on the front of the device or in one or more other appropriate locations. Further, while two pairs of stereoscopic cameras are illustrated, it should be understood that there can be additional pairs of cameras utilized as well as discussed elsewhere herein. The example device can include other elements useful for imaging as well, such as a light sensor 216 for determining an amount of ambient light and a white light LED 218, or other such illumination element, useful in illuminating objects within at least a portion of a field of view of at least one of the cameras 208, 210, 212, 214. Each image capture element may be, for example, a camera, a complimentary metal-oxide semiconductor (CMOS) device, or another appropriate image capturing element or sensor. It should be understood that while certain elements are shown to be included on a "front" or "back" side of the device that any or all of these elements can be positioned on various sides, edges, faces, or other regions of such a device. Further, terms such as "front," "back," and "top" are used for purposes of explanation and are not intended to be interpreted as required orientations unless otherwise stated. Further still, while terms such as "rectangular grid" or "rectangular pattern" are used herein to describe the relative arrangements of various cameras, it should be understood that pairs of cameras in such a system are positioned along orthogonal axes, such as horizontal and vertical axes, such that a camera of a pair is positioned horizontally or vertically (or along other orthogonal axes) with respect to another camera of the pair. It should be noted that the cameras do not have to form a proper rectangle, but can form other patterns such as a cross, set of parallel lines, points along a rectilinear grid, etc. Various other geometries and arrangements can be used as well within the scope of the various embodiments.

For any pair of these cameras that have at least a partially overlapping field of view, three-dimensional imaging can be performed by capturing image information for one or more objects from two different perspectives or points of view, and combining the information to produce a 3D image. In at least some embodiments, the fields of view can initially be matched through careful placement and calibration, such as by imaging a known calibration standards and adjusting an optical axis of one or more cameras to have those axes be substantially parallel. In other embodiments, the calibration process does not adjust the optical axis of any cameras, but instead provides an adjustment to be applied to any captured image data in order to account for and/or remove any detected misalignment. Methods for producing a 3D image using image information from different perspectives are well known in the art and will not be described in detail herein. Example approaches include calculating an amount of disparity through a process such as edge matching, feature location and matching, color matching, and/or texture matching, and combining the disparity information with color information from each perspective to generate a three-dimensional image, either before or at a time of display. For example, if the image information is matched then the image information can be combined and/or displayed directly on a 3D-capable display, wherein the human brain can effectively do at least some of the 3D processing. In other examples, the image information can be otherwise combined or processed at the time of display such that upon displaying the information a 3D image is generated. It should be understood, however, that 3D image data can be used for other purposes or for further processing, such that using the image data to generate and display a 3D image is not required. For example, the data can be used to determine shape and/or relative position information for various computer vision techniques.

Figure 3A:
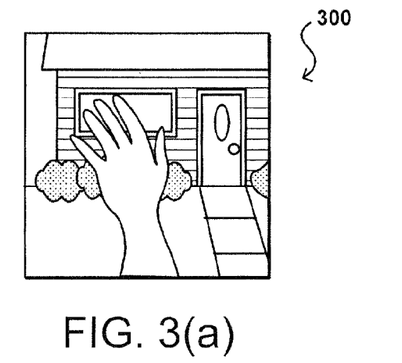
FIGS. 3(a), (b), (c), and 3(d) illustrate examples of images that can be used and/or generated using stereoscopic cameras in accordance with various embodiments.
Figure 3B:
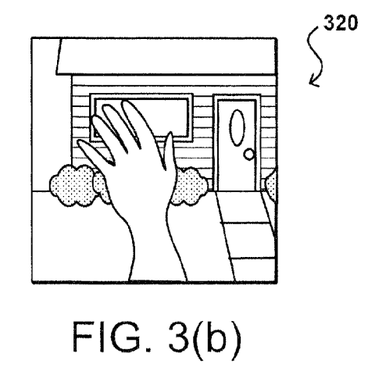
Figure 3C:
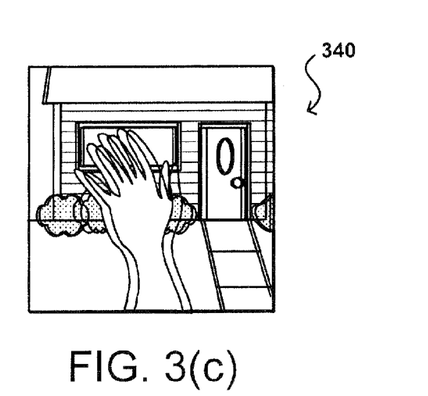
Figure 3D:
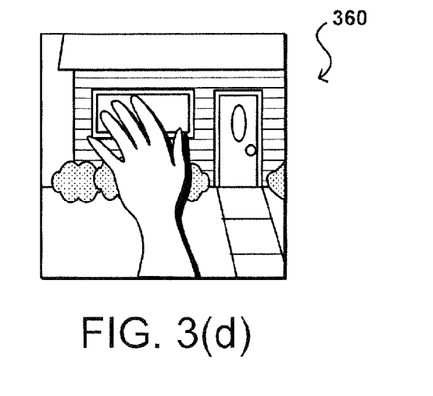

For example, FIG. 3(a) illustrates what will be referred to herein as a "left" image 300 and FIG. 3(b) illustrates what will be referred to herein as a "right" image 320, although other orientations can be used as well in other situations and embodiments. These images are each captured by one of a pair of cameras that are offset from each other along a horizontal axis, such that one camera is offset to the left and one offset to the right in this orientation. As discussed elsewhere herein, pairs of cameras can be offset in up and down directions, among other such options. Since each image is captured using a camera at a slightly different location, the position of objects in each image will be different. As an example, if one were to overlay one of these images 300 on top of the other 320, as illustrated in the example image 340 of FIG. 3(c), it can be seen that each of the objects is slightly offset, with objects closer to the camera being more offset than others, due to disparity differences as discussed previously. When displayed and/or viewed as a three dimensional image, however, the disparity causes the objects in the image to appear to be located at different depths, as illustrated in the image 360 of FIG. 3(d), resulting from the disparity between the two images.

In order for the images to combine to form an accurate three-dimensional image, the cameras used to capture the component images should be sufficiently aligned and/or rectified to represent the correct amount of disparity. Misalignments along the direction of the offset can cause objects to have an incorrect amount of disparity, which can affect the apparent depth or distance to the object. Misalignments in other directions can cause various potential problems, such as problems with processing computer vision algorithms, problems with objects being blurry or otherwise improperly rendered when the component images are combined for the three-dimensional image, etc. Accordingly, it can be desired to account for, and remove, any effects of the misalignment of the cameras. As mentioned, cameras can be increasingly misaligned over time, due to factors such as impact or shock to the device, natural degradation (e.g., due to temperature and/or humidity), vibration over time, mechanical wear or failure, and other such causes.

As discussed, it can be desirable to enable a computing device or electronic device including the cameras to be able to automatically rectify the stereo cameras without manual intervention by the user, although manual intervention or triggering can be used in some embodiments. It also can be desirable to enable the rectifying to be done without the need for a calibration object or other such item.

Accordingly, approaches in accordance with various embodiments can utilize images captured of random (or other) objects to attempt to rectify the stereo camera pairs. The rectifying can be performed at any appropriate time, such as at regular intervals, at random times, or in response to detected events, such as rapid movements or force as detected by a motion sensor or other component of the device. Where there are multiple pairs of stereo cameras on a device, different combinations of the cameras can be used to improve the rectification of each camera.

Figure 4A:
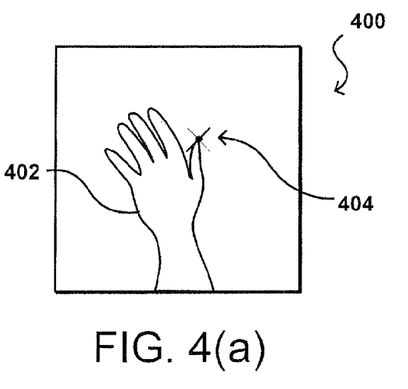
FIG. 4(a), 4(b), 4(c), 4(d), and 4(e) illustrate examples of locating feature points in an image and determining misalignment errors that can be utilized in accordance with various embodiments.

In one example, images can be simultaneously and/or concurrently captured by at least one pair of the cameras. Feature points, image points, or other such features of each image can be determined using one or more feature detection algorithms, as may recognize unique features or shapes, among other such features, that can be recognized in each image. As an example, FIG. 4(a) illustrates an image 400 including a view of a hand 402 of a person. If this image is fed to a feature point recognition algorithm, or other such process, a unique feature point such the tip 404 of the user's thumb can be located in each image. As known for such purposes, the feature can be located due to the presence of a transition point, recognized pattern, abrupt change in color or intensity, or other such aspect of the image at that location. Once a particular feature point is located in each of the images, the relative position of that point in the images can be analyzed.

Figure 4B:
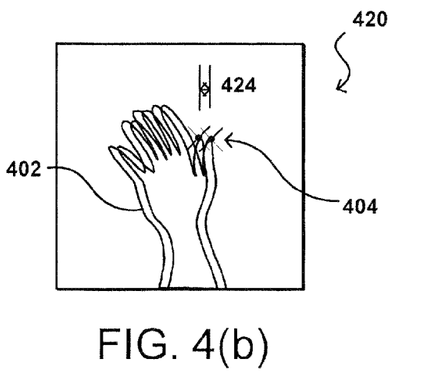

As an example, consider the image 420 represented in FIG. 4(b), which represents an overlay of images captured by a pair of stereo cameras offset horizontally, such as cameras C1 and C2 in FIG. 2. As can be seen, there is an expected amount of offset or disparity 424 due to the separation of the cameras along the horizontal axis (or x-axis). If the cameras are properly aligned, however, there will be no appreciable offset along the vertical axis (or y-axis). When properly rendered or viewed, the component parts of FIG. 4(b) then can provide a proper three-dimensional image.

Figure 4C:
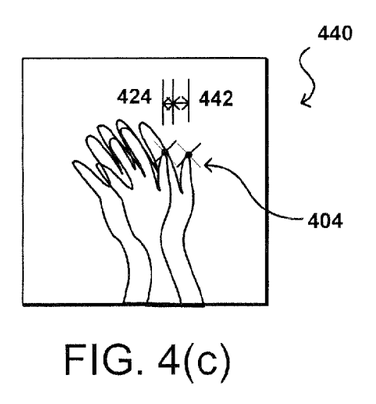
Figure 4D:
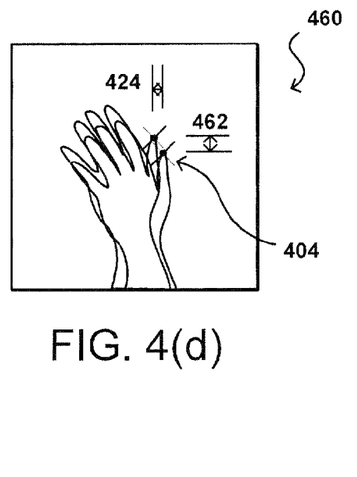
Figure 4E:
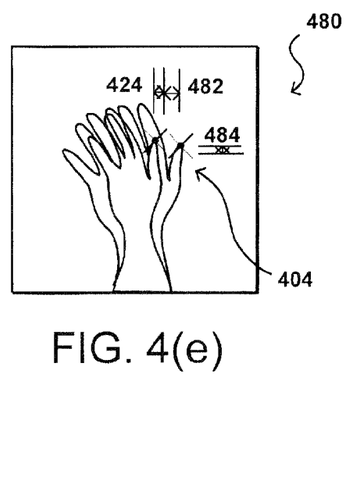

It may be the case, however, that there is some amount of misalignment of at least one of those cameras. For example, FIG. 4(c) illustrates an overlay 440 of images from the horizontally offset cameras as in FIG. 4(b). In this example, however, there is additional offset 442 along the x-axis, which can affect the apparent distance to that object in the three-dimensional image. This movement along the x-axis can be thought of as rotation along the y-axis, or "yaw" as it is often referred. Similarly, FIG. 4(d) illustrates an overlay 460 of images from the horizontally offset cameras as in FIG. 4(b), where there is an offset 442 along the y-axis, due to misalignment of at least one of the cameras. This offset along the y-axis can be attributed to rotation along the x-axis, or "pitch." As previously stated, for horizontally offset cameras such as cameras C1 and C2, there should be no appreciable offset along the y-axis. Further, FIG. 4(e) illustrates an overlay 480 of images from the horizontally offset cameras as in FIG. 4(b), where there is an offset 482 along the x-axis and an offset 484 along the y-axis, due to misalignment of at least one of the cameras. The combined offsets could be a translation in the x/y plane, and thus might be addresses as a combination of the previous two offsets. In this situation, however, the offset changes for each feature point in the image, as the misalignment results in a rotation of the image. This rotation along the z-axis is often referred to as "roll."

In order to determine how to properly rectify the cameras, then, it is not enough to simply look at the translations along the x-axis and y-axis between the images, but to look at the translations of the various feature points in order to also account for any amount of rotation among the cameras. Such an approach enables adjusting for offsets in roll, pitch, and yaw.

One approach that can be utilized in accordance with various embodiments takes into account the fact that the cameras will generally become misaligned slowly over a period of time, such that if a regular rectification process is employed the cameras will move only a slight amount between processing times. The presence of only small angles then can allow for a small angle approximation, where offsets can be analyzed and accounted for without having to consider differences in changes due to distance variation with respect to the change in angle. Further, such a process can take advantage of the fact that cameras such as C1, C2, C3, and C4 in FIG. 2 are aligned such that for any given pair of the cameras with a horizontal or vertical offset, either the x-coordinates or y-coordinates of the feature points in images captured by those cameras should be the same, depending on the orientation (as discussed with respect to FIG. 4(d)). For example, in FIG. 2 feature points in an image captured by C1 should have the same y-coordinates as the corresponding feature points in an image captured by C2, and the same goes for images capture by C3 with respect to C4. Similarly, feature points in an image captured by C1 should have the same x-coordinates as the corresponding feature points in an image captured by C3, and the same goes for images capture by C2 with respect to C4. In order to reliably perform a rectification of the cameras, approaches in accordance with various embodiments can attempt to concurrently solve for yaw, pitch, and roll of each of the cameras of interest.

Figure 5:
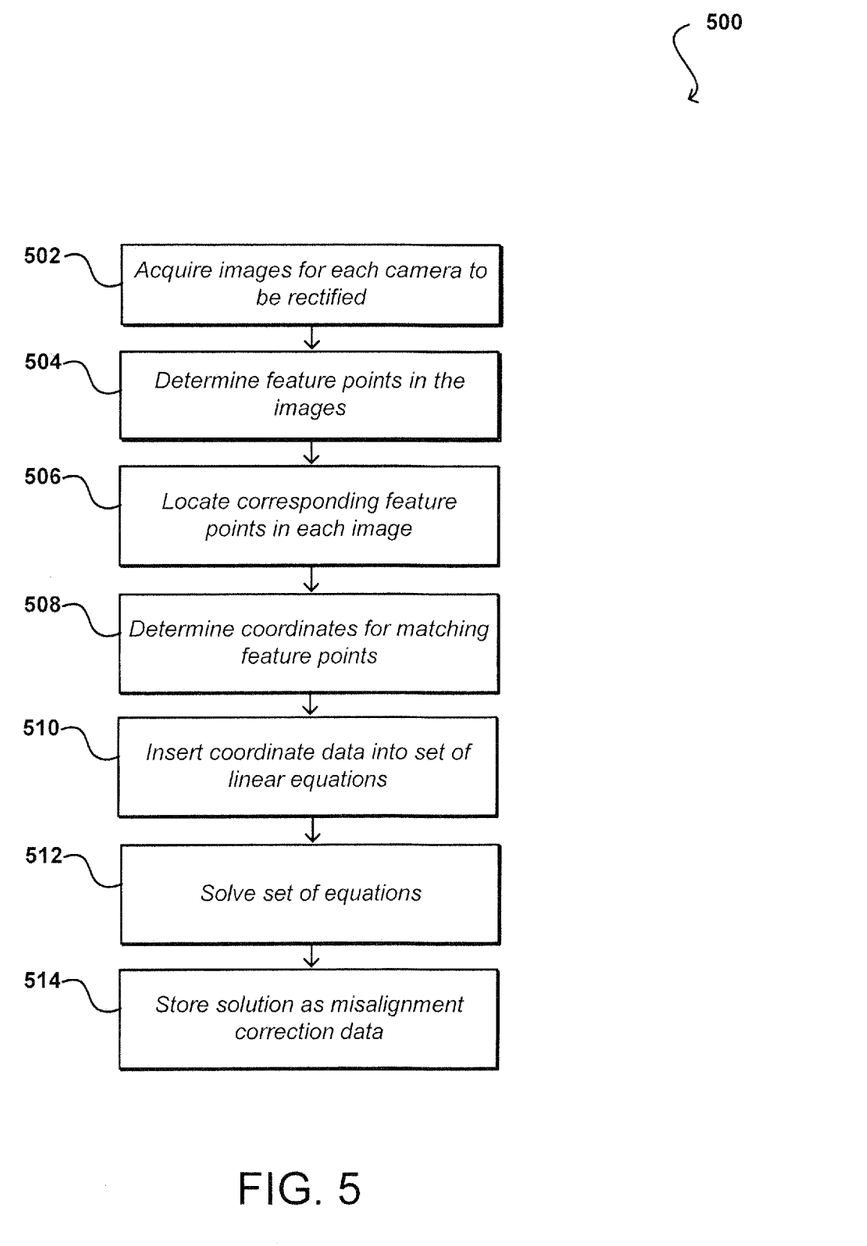
FIG. 5 illustrates a first example process for determining misalignment errors that can be analyzed in accordance with various embodiments.

FIG. 5 illustrates one example process 500 for performing dynamic rectification that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, images are acquired 502 using each camera to be rectified. As discussed, this can include two or more pairs of cameras arranged in a pattern, such as a rectangle or regular array, such that different pairs of the cameras can be used to perform three-dimensional imaging, and the pairs can be selected in at least two different directions, which in at least some embodiments are orthogonal directions. Also, as discussed elsewhere herein, in at least some embodiments all cameras of interest do not have to capture a respective image at substantially the same time, but at least pairs of cameras to be rectified should capture images at substantially the same time. Each captured image can be analyzed to determine 504 a set of feature points or other such aspects or portions of the image that can be located in the other images. As known for such purposes, feature points can be determined using algorithms such as feature detection algorithms (e.g., SIFT or SURF), corner finding algorithms, pattern matching algorithms, contour detection algorithms, and the like. For this example, the process uses a feature detection algorithm to locate specific points in each image. Corresponding feature points can then be located 506 in each of the captured images, to the extent those feature points are represented in each of those images.

Thus, a feature point corresponding to an object represented in an image captured by four cameras will have four pairs of coordinates, with an (x,y) or other such pair of coordinates representing the location of that feature point in each image. As discussed elsewhere herein, the examples utilize a single feature point for purposes of explanation, but it should be understood that multiple feature points will generally be analyzed and/or otherwise utilized in various analyses within the scope of the various embodiments.

Once the feature points are detected, the coordinates of those feature points in each image can be determined 508. For purposes of explanation, each feature point in an image captured by camera #1 (C1 in the example of FIG. 2) will have representative coordinates of $(x_1, y_1)$, each corresponding feature point in an image captured by camera #2 (C2 in the example of FIG. 2) will have representative coordinates of $(x_2, y_2)$, etc. In the case where all the cameras are aligned, the feature points would have at least some similar values, such that for pitch and roll $y_1=y_2$ and $y_3=y_4$, and for yaw and roll $x_1=x_3$ and $x_2=x_4$. These values indicate that the stereo pairs (C1,C2), (C3,C4), (C1,C3), and (C2,C4) are rectified. If there is any misalignment, however, at least one of these rules will be violated. As an example, the following cost equation:

$$J=(y_1-y_2)^2+(y_3-y_4)^2+(x_1-x_3)^2+(x_2-x_4)^2$$

can be summed over all feature points. In perfect conditions, J=0. With noise, J≈T, a small noise threshold. When misaligned, however, J>>T. Thus, some small variation in alignment might be allowed, but there can be a minimum misalignment threshold specified such that when J exceeds that threshold, an attempt can be made to adjust for the misalignment to bring J back to on the order of T or less.

If misalignments are detected and corrected relatively frequently, as may vary by device and/or design, for example, it can reasonably be assumed that in most cases the misalignment errors in yaw, pitch, and/or roll over the intervening time period (e.g., an hour or a day) will be relatively small, such as with an angle of less than five degrees or π/36 radians. For such small angles, a small angle approximation can be used whereby small angle variations can be modeled as small linear displacements. As an example, for small angles:

$\sin(\theta) \approx \theta$
$\cos(\theta) \approx 1$
$\tan(\theta) \approx \theta$ And, where an in-plane rotation (i.e., roll) by t degrees on a point $(x_1, y_1)$ returns a point $(x_1 r, y_1 r)$:

$$\begin{bmatrix} x_1 r \\ y_1 r \end{bmatrix} = \begin{bmatrix} \cos(\text{roll}) & -\sin(\text{roll}) \\ \sin(\text{roll}) & \cos(\text{roll}) \end{bmatrix} \begin{bmatrix} x_1 \\ y_1 \end{bmatrix}$$

such that for a small roll value:

$$\begin{bmatrix} x_1 r \\ y_1 r \end{bmatrix} = \begin{bmatrix} 1 & -\text{roll} \\ \text{roll} & 1 \end{bmatrix} \begin{bmatrix} x_1 \\ y_1 \end{bmatrix}$$

Small amounts of pitch variation in a stereo pair then can be modeled as a uniform relative displacement ty in the y-axis direction (the relative pitch being analyzed as, for a single pair of cameras, only a relative pitch variation can be determined without a fixed frame of reference):

$ty = \text{focalLength} * \tan(\text{relativePitch})$ and small amounts of yaw variation in a stereo pair can be modeled as a uniform relative displacement tx in the x-axis direction:

$tx = \text{focalLength} * \tan(\text{relativeYaw})$

The focal length is a retrievable characteristic of the cameras, and is analyzed at least in part because longer focal lengths generally are more sensitive to misalignments. It can be desirable to determine the roll and x,y translation values such that the following are satisfied:

points in images from C1 and C2 match in the y-component
points in images from C1 and C3 match in the x-component
points in images from C3 and C4 match in the y-component
points in images from C2 and C4 match in the x-component In order to determine the appropriate values, a feature point detected in an image captured by one of the cameras can be designated as $(x_i, y_i)$ for camera $C_i$, where i=1, 2, 3, 4 (or more for additional cameras). It is desired to find the values for $\text{roll}_1$, $\text{roll}_2$, $\text{roll}_3$, and $\text{roll}_4$, as well as for displacements $(tx_1, ty_1)$, $(tx_2, ty_2)$, $(tx_3, ty_3)$, and $(tx_4, ty_4)$. To solve for these parameters for all feature points, a set of linear equations can be determined based on the information above. In this example, these linear equations are given by the following:

$x_1 * \text{roll}_1 + y_1 + ty_1 = x_2 * \text{roll}_2 + y_2 + ty_2$ $x_1 - y_1 * \text{roll}_1 + tx_1 = x_3 - y_3 * \text{roll}_3 + tx_3$ $x3 * \text{roll}_3 + ty_3 + y_3 = x_4 * \text{roll}_4 + ty_4 + y_4$ $x_2 - y_2 * \text{roll}_2 + tx_2 = x_4 - y_4 * \text{roll}_4 + tx_4$ The coordinates from the images (e.g., three or more feature point coordinates) can be inserted 510 in the set of four linear equations. These equations then can be solved 512, such as by using a least squares matching, robust estimation, Gauss-Newton, QR decomposition, or Singular Value Decomposition process. The results (e.g., calibration parameters) then can be stored 514 as misalignment corrections to be applied to images captured by each of the cameras. For example, the calibration parameters can include lateral offset amounts for small angles. In other cases, the calibration parameters can include misalignments in roll, pitch, and/or yaw for any or all of the cameras analyzed, such that disparity can be corrected for subsequent images. Various other types of correction or misalignment data can be stored as well within the scope of the various embodiments. If a device has a mechanical mechanism for realigning the cameras, this information can alternatively be provided to the mechanism instead of being stored for future image adjustments. In embodiments where the misalignments are relative, the values stored can be normalized and/or adjusted such that the minimum average amount of adjustment is applied to each camera while still accounting for misalignment. As discussed, the process can be repeated at relatively regular and/or short intervals, or at other appropriate times, in order to ensure that the cameras are relatively aligned and that any misalignment errors are small. The ability to periodically detect and solve for small misalignments in yaw, pitch, and/or roll misalignment errors enables the calibration parameters to be updated and applied over time in order to maintain acceptable stereo rectification.

Figure 6:
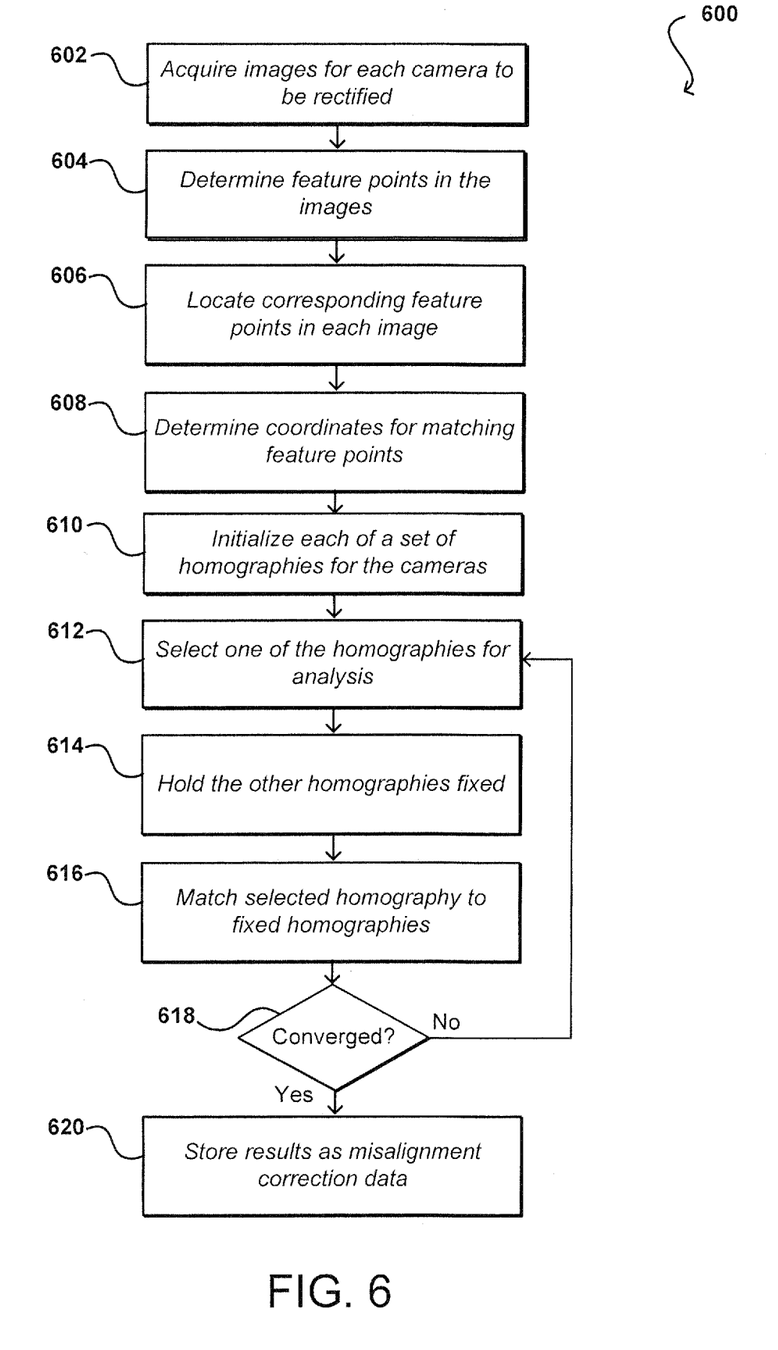
FIG. 6 illustrates a second example process for determining misalignment errors that can be analyzed in accordance with various embodiments.

FIG. 6 illustrates another example process 600 for performing dynamic rectification that can be utilized in accordance with various embodiments. As with the prior example, images are acquired 602 using each camera to be rectified, and each captured image can be analyzed to determine 604 feature points or other such aspects or portions of the image that can be located in the other images. Corresponding feature points can then be located 606 in each of the captured images, to the extent those feature points are represented in each of those images. Once the feature points are detected, the coordinates of those feature points in each image can be determined 608.

As discussed above, the small misalignments can be modeled as linear transformations. One way to express a linear mapping that warps one image to another, while maintaining straightness of lines, is through use of a homography, H. A homography, as used in general for purposes such as computer vision, is an invertible transformation (usually expressed as a 3×3 matrix) from a projective space to itself that maps straight lines to straight lines. A correction process for misalignment of the four cameras can then initialize or otherwise select 610 an initial set of four homographies $H_1$, $H_2$, $H_3$, and $H_4$ (such as one identity matrix for each respective camera, or an estimated matrix based on previous information), and can process these homographies such that the coordinates of the feature points are aligned. To perform the estimations, $(x_1r, y_1r)$ can be set as the rectified co-ordinates obtained from $(x_1, y_1)$ using homography $H_1$ applied to images from camera $C_1$, given:

$$\begin{bmatrix} x_1r \\ y_1r \end{bmatrix} = H_1 \begin{bmatrix} x_1 \\ y_1 \end{bmatrix}$$

Similarly $(x_2r, y_2r)$ can be so defined and used for $H_2$, $(x_3r, y_3r)$ for $H_3$, and $(x_4r, y_4r)$ for $H_4$. In certain conventional approaches, a fundamental matrix between pairs is determined before estimating the homographies. In this example, the process would instead estimate four fundamental matrices. Unfortunately, estimating the fundamental matrix is extremely unreliable. Additionally, these approaches cannot constrain the first row of the homography matrix, which could result in sub-optimal solutions being estimated.

Thus, approaches in accordance with various embodiments can make certain assumptions as discussed above. For example, it can be assumed that $y_1r=y_2r$, $y_3r=y_4r$ $x_1r=x_3r$, and $x_2r=x_4r$, independent of the relationships between the original pairs of co-ordinates. As discussed, there are four homographies to be estimated, and these homographies affect each other since the device utilizes a coupled stereo system. Accordingly, an iterative approach can be taken. In this example, one of the homographies is selected 612 for analysis. The other homographies are then held fixed 614, assuming them to be optimal. An attempt is then made to match 616 the selected homography to the fixed homographies. In order to perform the matching, a new cost Jr can be defined as:

$$Jr=(y_1r-y_2r)^2+(y_3r-y_4r)^2+(x_1r-x_3r)^2+(x_2r-x_4r)^2,$$

which can be summed over the feature points. The matching feature points $(x_1, y_1)$, $(x_2, y_2)$, $(x_3, y_3)$ and $(x_4, y_4)$ can be provided as inputs, and the initial homographies $H_1$, $H_2$, $H_3$, and $H_4$ can be assumed to be identity. Accordingly, the algorithm can be processed and/or optimized until Jr is sufficiently minimized for each of the homographies, when the others are held fixed (since each processing results in a reduction of Jr, as discussed elsewhere herein). Once the matching homography has been determined, another determination can be made as to whether the cost function Jr has converged 618. In some embodiments, this determination can be made only after the set of homographies has had another iteration, while in other embodiments the convergence can be analyzed after each individual iteration. If the cost function has not converged, the process can continue for another iteration. In each of the steps Jr is reduced, such that the cost function will eventually converge. If the cost function is determined to converge, according to one or more convergence criteria known or used for such purposes, the results (including types of results discussed elsewhere herein) can be stored 620 as misalignment corrections to be applied to images captured by each of the cameras.

Other approaches can be used as well within the scope of the various embodiments. For example, hypothesis testing can be used for different yaw, pitch, and roll solutions found using non-derivative base cost minimization approaches. These approaches can include, for example, Nelder-Mead, simplex search, or globally optimal solutions such as simulated annealing. Such an approach can be utilized since, for example, the intrinsic parameters of the camera can be obtained. Such an approach is similar to that discussed with respect to FIG. 6, except that this approach attempts to solve directly for yaw, pitch, and roll values, as a different way of expressing the transformation that has been applied.

For at least some of these and other such processes, it can be desirable to perform the misalignment analysis over a large set of feature points, for a significant number of frames or images, in order to attempt to average out any noise issues. Further, the timing of the image capture, at least for pairs of cameras being analyzed, should be as close as possible in order to avoid motion- or time-based effects, which can negatively impact the results. In at least some embodiments, it can be desirable to implement a global shutter to attempt to coordinate the timing of the capturing of the various images to be analyzed. In some embodiments, a motion sensor, such as an inertial sensor or accelerometer, can be used to determine whether the device is moving, such that alignment adjustments are not performed when the device is moving and results might be impacted by the motion. Various other criteria or optimizations can be utilized with approaches discussed herein as well within the scope of the various embodiments.

Figure 7:
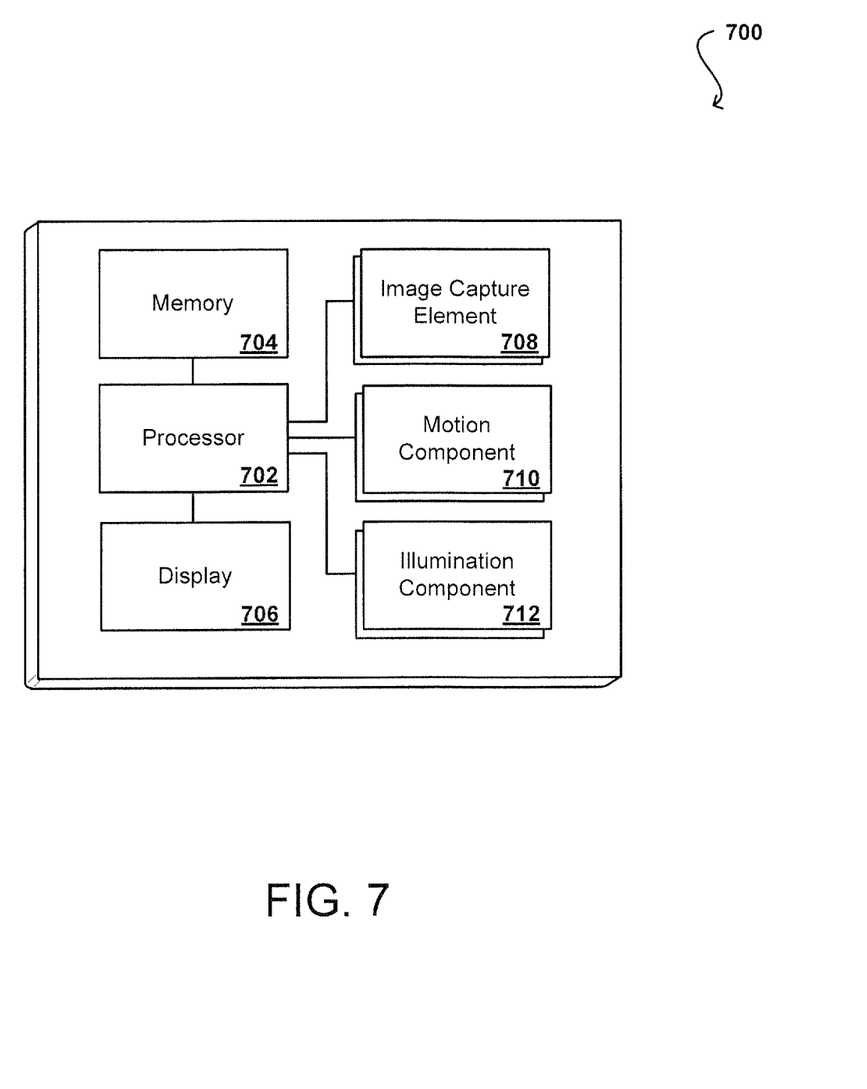
FIG. 7 illustrates an example configuration of components of a computing device such as that illustrated in FIG. 2.

FIG. 7 illustrates an example set of basic components of a computing device 700, such as the device 200 described with respect to FIG. 2. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 708, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one dedicated gesture component, such as an IR sensor or detector, operable to capture information for use in determining gestures or motions of the user, which will enable the user to provide input through the portable device without having to actually contact and/or move the portable device. The device can include at least one motion component 710, such as an accelerometer or inertial sensor to measure translation, an electronic compass to calibrate direction in up to three dimensions, an electronic gyroscope to determine and/or track changes in orientation, and other such elements. Motion determining elements can help in determining movement and using the determined movement to correct image information. The device also can include at least one illumination element 712, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user.

This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 8:
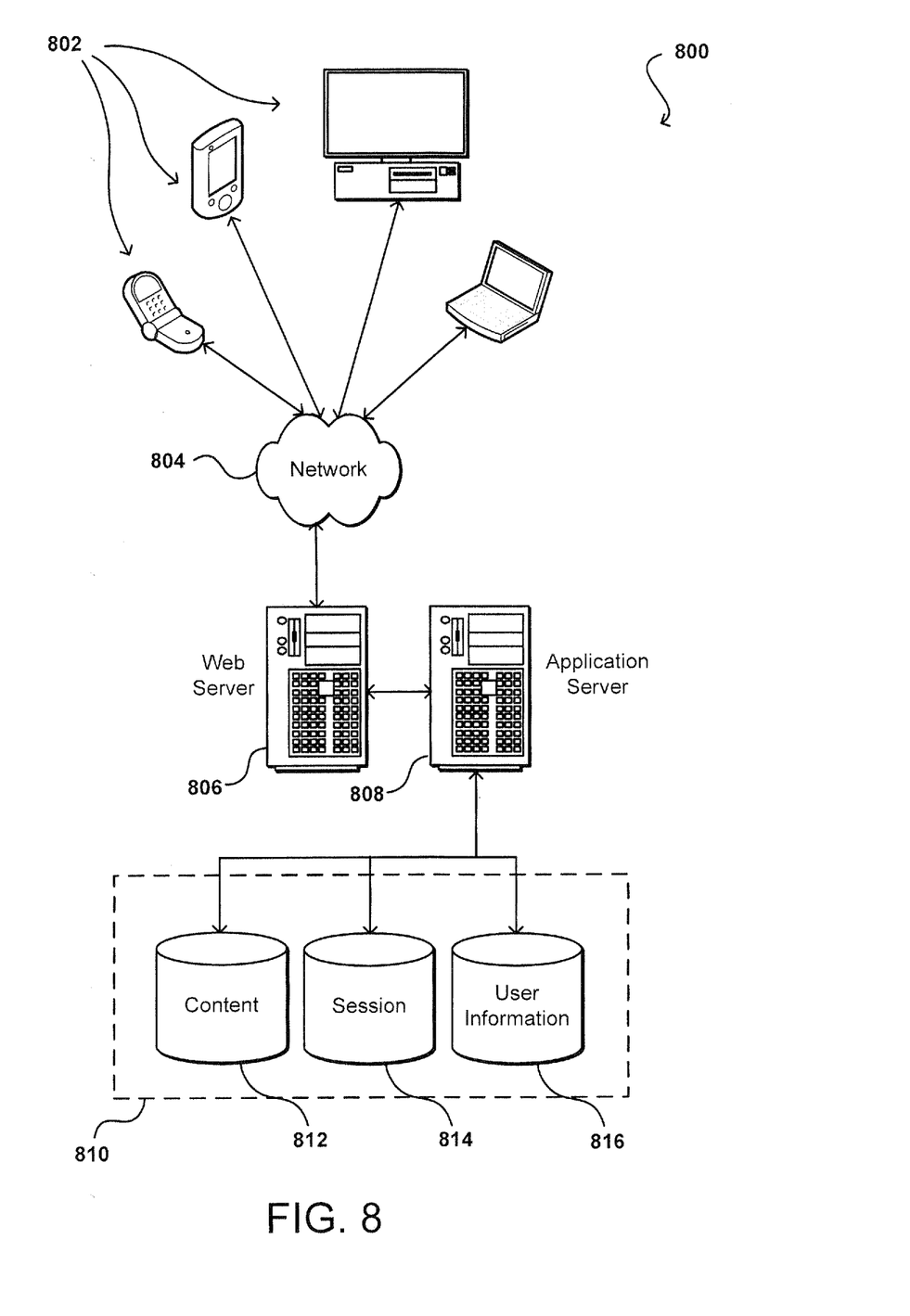
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, hand-held messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®. Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of rectifying a set of cameras, comprising:
   receiving an instruction to rectify a set of cameras of a computing device, the set of cameras arranged in a rectangular array including at least a first camera positioned at a first corner of the rectangular array, a second camera positioned at a second corner of the rectangular array, a third camera positioned at a third corner of the rectangular array, and a fourth camera positioned at a fourth corner of the rectangular array;
   capturing a first image using the first camera;
   capturing a second image using the second camera;
   capturing a third image using the third camera;
   capturing a fourth image using the fourth camera;
   identifying a first plurality of feature points corresponding to one or more objects represented in the first image;
   identifying a second plurality of feature points corresponding to the one or more objects represented in the second image;
   identifying a third plurality of feature points corresponding to the one or more objects represented in the third image;
   identifying a fourth plurality of feature points corresponding to the one or more objects represented in the fourth image;
   determining first coordinates of at least a portion of the first plurality of feature points corresponding to at least a portion of the second plurality of feature points;
   determining second coordinates of at least a portion of the third plurality of feature points corresponding to at least a portion of the fourth plurality of feature points;
   determining third coordinates of at least a portion of the first plurality of feature points corresponding to at least a portion of the third plurality of feature points;
   determining fourth coordinates of at least a portion of the second plurality of feature points corresponding to at least a portion of the fourth plurality of feature points;
   determining, at a first time period, first calibration parameters for aligning a first optical axis of the first camera with respect to a second optical axis of the second camera, a third optical axis of the third camera, and a fourth optical axis of the fourth camera based at least in part by processing the first coordinates and the third coordinates;
   determining, at the first time period, second calibration parameters for aligning the second optical axis with respect to the first optical axis, the third optical axis, and the fourth optical axis based at least in part by processing the first coordinates and the fourth coordinates;

determining, at the first time period, third calibration parameters for aligning the third optical axis with respect to the first optical axis, the second optical axis, and the fourth optical axis based at least in part by processing the second coordinates and the third coordinates;

determining, at the first time period, fourth calibration parameters for aligning the fourth optical axis with respect to the first optical axis, the second optical axis, and the third optical axis based at least in part by processing the second coordinates and the fourth coordinates;

storing the first calibration parameters, the second calibration parameters, the third calibration parameters, and the fourth calibration parameters;

capturing a fifth image using the first camera;

capturing a sixth image using one of the second camera, the third camera, or the fourth camera; and using the first calibration parameters and one of the second calibration parameters, the third calibration parameters, or the fourth calibration parameters to generate a three-dimensional image corresponding to the fifth image and the sixth image.

2. The method of claim 1, wherein the instruction is received at most a determined amount of time after a previous instruction, wherein at least one of the first calibration parameters, the second calibration parameters, the third calibration parameters, or the fourth calibration parameters are further based at least in part on a small angle approximation.

3. The method of claim 1, further comprising:

generating one or more first linear equations for the first camera including one or more first variables for aligning the first optical axis;

generating one or more second linear equations for the second camera including one or more second variables for aligning the second optical axis;

generating one or more third linear equations for the third camera including one or more third variables for aligning the third optical axis;

generating one or more fourth linear equations for the fourth camera including one or more fourth variables for aligning the fourth optical axis; and solving the one or more first linear equations, the one or more second linear equations, the one or more third linear equations, and the one or more fourth linear equations to obtain one or more first values for aligning the first optical axis, one or more second values for aligning the second optical axis, one or more third values for aligning the third optical axis, and one or more fourth values for aligning the fourth optical axis.

4. The method of claim 1, further comprising:

initializing a first homography for the first camera initializing a second homography for the second camera;

initializing a third homography for the third camera;

initializing a fourth homography for the fourth camera;

determining first homography values for the first homography based at least in part by holding second homography values for the second homography, third homography values for the third homography, and fourth homography values for the fourth homography fixed and matching the first homography to at least one of the second homography, the third homography, or the fourth homography;

determining the second homography values based at least in part by holding the first homography values, the third homography values, and the fourth homograph values fixed and matching the second homography to at least one of the first homography, the third homography, and the fourth homography;

determining the third homography values based at least in part by holding the first homography values, the second homography values, and the fourth homograph values fixed and matching the third homography to at least one of the first homography, the second homography, and the fourth homography;

determining the fourth homography values based at least in part by holding the first homography values, the second homography values, and the third homograph values fixed and matching the fourth homography to at least one of the first homography, the second homography, and the third homography;

determining first values for aligning the first optical axis based at least in part on the first homography values;

determining second values for aligning the second optical axis based at least in part on the second homography values;

determining third values for aligning the third optical axis based at least in part on the third homography values; and determining fourth values for aligning the fourth optical axis based at least in part on the fourth homography values.

5. The method of claim 1, further comprising:

capturing a seventh image using the first camera;

capturing an eighth image using the second camera;

capturing a ninth image using the third camera;

capturing a tenth image using the fourth camera;

identifying a fifth plurality of feature points corresponding to one or more second objects represented in the seventh image;

identifying a sixth plurality of feature points corresponding to the one or more second objects represented in the eighth image;

identifying a seventh plurality of feature points corresponding to the one or more second objects represented in the ninth image;

identifying an eighth plurality of feature points corresponding to the one or more second objects represented in the tenth image;

determining fifth coordinates of at least a portion of the fifth plurality of feature points corresponding to at least a portion of the sixth plurality of feature points;

determining sixth coordinates of at least a portion of the seventh plurality of feature points corresponding to at least a portion of the eighth plurality of feature points;

determining seventh coordinates of at least a portion of the fifth plurality of feature points corresponding to at least a portion of the seventh plurality of feature points;

determining eighth coordinates of at least a portion of the sixth plurality of feature points corresponding to at least a portion of the eighth plurality of feature points;

wherein the first calibration parameters are further based at least in part on the fifth coordinates and the seventh coordinates, wherein the second calibration parameters are further based at least in part on the fifth coordinates and the eighth coordinates, wherein the third calibration parameters are further based at least in part on the sixth coordinates and the seventh coordinates, and wherein the fourth calibration parameters are further based at least in part on the sixth coordinates and the eighth coordinates.

6. A computer-implemented method, comprising:
- obtaining image data captured by at least a first camera, a second camera, a third camera, and a fourth camera, the image data including at least a first image captured by the first camera, a second image captured by the second camera, a third image captured by the third camera, and a fourth image captured by the fourth camera, the first camera, the second camera, the third camera, and the fourth camera having at least partially overlapping fields of view;
- determining first coordinates for a first plurality of feature points represented in the first image corresponding to at least one of a second plurality of feature points represented in the second image, a third plurality of feature points represented in the third image, or a fourth plurality of feature points represented in the fourth image;
- determining second coordinates for the second plurality of feature points corresponding to at least one of the third plurality of feature points or the fourth plurality of feature points;
- determining, at a first time period, one or more first calibration parameters for aligning a first optical axis of the first camera with respect to at least one of a second optical axis of the second camera, a third optical axis of the third camera, or a fourth optical axis of the fourth camera based at least in part on the first coordinates;
- determining, at the first time period, one or more second calibration parameters for aligning the second optical axis with respect to at least one of the third optical axis or the fourth optical axis based at least in part on the second coordinates; and
- storing the one or more first calibration parameters for aligning the first optical axis with respect to the at least one of the second optical axis, the third optical axis, or the fourth optical axis;
- storing the one or more second calibration parameters for aligning the second optical axis with respect to the at least one of the third optical axis or the fourth optical axis;
- capturing at least one first pair of subsequent images using the first camera and the at least one of the second camera, the third camera, or the fourth camera;
- capturing at least one second pair of subsequent images using the second camera and the at least one of the third camera or the fourth camera;
- generating first three-dimensional data based at least in part on the one or more first calibration parameters and the at least one first pair of subsequent images; and
- generating second three-dimensional data based at least in part on the one or more second calibration parameters and the at least one second pair of subsequent images.

7. The computer-implemented method of claim 6, further comprising:
- determining an offset of the first plurality of feature points with respect to at least one of the second plurality of feature points, the third plurality of feature points, or the fourth plurality of feature points.

8. The computer-implemented method of claim 6, further comprising:
- determining one or more first linear equations for the first camera including one or more first variables for aligning the first optical axis;
- determining one or more second linear equations for the second camera including one or more second variables for aligning the second optical axis; and
- solving at least the one or more first linear equations and the one or more second linear equations to obtain at least one or more first values for aligning the first optical axis and one or more second values for aligning the second optical axis.

9. The computer-implemented method of claim 6, wherein at least one of the one or more first calibration parameters or the one or more second calibration parameters are further based at least in part on one or more small angle approximations.

10. The computer-implemented method of claim 6, further comprising:
- initializing a first homography for the first camera;
- initializing a second homography for the second camera;
- initializing a third homography for the third camera;
- initializing a fourth homography for the fourth camera;
- determining first homography values for the first homography based at least in part by holding second homography values for the second homography, third homography values for the third homography, and fourth homography values for the fourth homography fixed and matching the first homography to at least one of the second homography, the third homography, or the fourth homography;
- determining the second homography values based at least in part by holding the first homography values, the third homography values, and the fourth homograph values fixed and matching the second homography to at least one of the first homography, the third homography, and the fourth homography;
- determining the third homography values based at least in part by holding the first homography values, the second homography values, and the fourth homograph values fixed and matching the third homography to at least one of the first homography, the second homography, and the fourth homography;
- determining the fourth homography values based at least in part by holding the first homography values, the second homography values, and the third homograph values fixed and matching the fourth homography to at least one of the first homography, the second homography, and the third homography;
- determining first values for aligning the first optical axis based at least in part on the first homography values; and
- determining second values for aligning the second optical axis based at least in part on the second homography values.

11. The computer-implemented method of claim 10, further comprising:
- repeating determining respective homography values for each of the first camera, the second camera, the third camera, and the fourth camera; and
- determining convergence of a cost function.

12. The computer-implemented method of claim 6, wherein the first image, the second image, the third image, and the fourth image are captured at substantially a same time.

13. The computer-implemented method of claim 6, wherein one or more calibration parameters relate to adjusting at least one of roll, pitch, or yaw.

14. The computer-implemented method of claim 6, further comprising:
- determining the first plurality of feature points using a feature detection algorithm; and
- locating the first plurality of feature points corresponding to at least one of the second plurality of feature points, the third plurality of feature points, or the fourth plurality of feature points.

15. The computer-implemented method of claim 6, further comprising:
   using hypothesis testing to select values for the one or more first calibration parameters as determined using one or more non-derivative based cost minimization algorithms.

16. A computing device, comprising:
   at least one processor;
   a first camera, a second camera, a third camera, and a fourth camera having at least partially overlapping fields of view; and
   memory including instructions that, when executed by the at least one processor, cause the computing device to:
      acquire a first image using the first camera;
      acquire a second image using the second camera;
      acquire a third image using the third camera;
      acquire a fourth image using the fourth camera;
      determine first coordinates for a first plurality of feature points represented in the first image the corresponding to at least one of a second plurality of feature points represented in the second image, a third plurality of feature points represented in the third image, or a fourth plurality of feature points represented in the fourth image;
      determine second coordinates for the second plurality of feature points corresponding to at least one of the third plurality of feature points or the fourth plurality of feature points;
      determine, at a first time period, one or more first calibration parameters for aligning a first optical axis of the first camera with respect to at least one of a second optical axis of the second camera, a third optical axis of the third camera, or a fourth optical axis of the fourth camera based at least in part upon the first coordinates;
      determining, at the first time period, one or more second calibration parameters for aligning the second optical axis with respect to at least one of the third optical axis or the fourth optical axis based at least in part on the second coordinates; and
      store the one or more first calibration parameters for aligning the first optical axis with respect to the at least one of the second optical axis, the third optical axis, or the fourth optical axis;
      store the one or more second calibration parameters for aligning the second optical axis with respect to the at least one of the third optical axis or the fourth optical axis;
      acquire at least one first pair of subsequent images using the first camera and the at least one of the second camera, the third camera, or the fourth camera;
      acquire at least one second pair of subsequent images using the second camera and the at least one of the third camera or the fourth camera;
      generate first three-dimensional data based at least in part on the one or more first calibration parameters and the at least one first pair of subsequent images; and
      generate second three-dimensional data based at least in part on the one or more second calibration parameters and the at least one second pair of subsequent images.

17. The computing device of claim 16, wherein the instructions when executed further cause the computing device to:
   determine one or more first linear equations for the first camera including one or more first variables for aligning the first optical axis;
   determine one or more second linear equations for the second camera including one or more second variables for aligning the second optical axis; and
   solve at least the one or more first linear equations and the one or more second linear equations to obtain at least one or more first values for aligning the first optical axis and one or more second values for aligning the second optical axis.

18. The computing device of claim 16, wherein the instructions when executed further cause the computing device to:
   initialize a first homography for the first cameras;
   initialize a second homography for the second camera;
   initialize a third homography for the third camera;
   initialize a fourth homography for the fourth camera;
   determine first homography values for the first homography based at least in part by holding second homography values for the second homography, third homography values for the third homography, and fourth homography values for the fourth homography fixed and matching the first homography to at least one of the second homography, the third homography, or the fourth homography;
   determine the second homography values based at least in part by holding the first homography values, the third homography values, and the fourth homograph values fixed and matching the second homography to at least one of the first homography, the third homography, and the fourth homography;
   determine the third homography values based at least in part by holding the first homography values, the second homography values, and the fourth homograph values fixed and matching the third homography to at least one of the first homography, the second homography, and the fourth homography;
   determine the fourth homography values based at least in part by holding the first homography values, the second homography values, and the third homograph values fixed and matching the fourth homography to at least one of the first homography, the second homography, and the third homography;
   determine first values for aligning the first optical axis based at least in part on the first homography values; and
   determine second values for aligning the second optical axis based at least in part on the second homography values.

19. The computing device of claim 16, wherein the instructions when executed further cause the computing device to:
   use hypothesis testing to select values for the one or more first calibration parameters as determined using one or more non-derivative based cost minimization algorithms.

20. The computing device of claim 16, further comprising:
   a motion sensor,
   wherein the first image, the second image, the third image, and the fourth image are automatically acquired at a time the computing device is substantially motionless as determined using the motion sensor.

* * * * *